(12) United States Patent
Ohuchi et al.

(10) Patent No.: US 7,260,990 B2
(45) Date of Patent: Aug. 28, 2007

(54) ANGULAR SPEED SENSOR AND METHOD FOR FABRICATING THE SAME

(75) Inventors: Satoshi Ohuchi, Hyogo (JP); Hiroyuki Aizawa, Osaka (JP); Toshiyuki Nozoe, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/565,952

(22) PCT Filed: Jun. 23, 2005

(86) PCT No.: PCT/JP2005/011517

§ 371 (c)(1),
(2), (4) Date: Jan. 26, 2006

(87) PCT Pub. No.: WO2006/006361

PCT Pub. Date: Jan. 19, 2006

(65) Prior Publication Data

US 2006/0272412 A1    Dec. 7, 2006

(30) Foreign Application Priority Data

Jul. 8, 2004 (JP) .............................. 2004-201513

(51) Int. Cl.
*G01P 9/04* (2006.01)
*G01P 19/56* (2006.01)

(52) U.S. Cl. .................... 73/504.12; 73/504.16
(58) Field of Classification Search ............. 73/504.04, 73/504.12, 504.15, 504.16; 310/370, 329, 310/316, 317, 364–366
See application file for complete search history.

(56) References Cited

U.S. PATENT DOCUMENTS

| | | | |
|---|---|---|---|
| 5,814,920 A | * | 9/1998 | Takeuchi et al. ............ 310/330 |
| 6,119,518 A | | 9/2000 | Itou et al. |
| 6,865,945 B2 | * | 3/2005 | Hayashi et al. .......... 73/504.16 |
| 6,880,399 B1 | * | 4/2005 | Okoshi et al. ................ 73/493 |
| 6,992,421 B2 | * | 1/2006 | Ikeda et al. .................. 310/328 |
| 7,002,284 B2 | * | 2/2006 | Ouchi et al. ................ 310/370 |
| 7,107,843 B2 | * | 9/2006 | Ohuchi et al. ........... 73/504.16 |
| 2004/0007065 A1 | | 1/2004 | Fujimoto et al. |

FOREIGN PATENT DOCUMENTS

| | | | |
|---|---|---|---|
| JP | 10-47971 A | | 2/1998 |
| JP | 2002-257549 | | 9/2002 |
| JP | 2004-61486 A | | 2/2004 |
| WO | WO 03/052350 | * | 6/2003 |

* cited by examiner

*Primary Examiner*—Helen Kwok
(74) *Attorney, Agent, or Firm*—McDermott Will & Emery LLP

(57) ABSTRACT

Provided are an angular velocity sensor with improved reliability by preventing an electric short circuit resulting from etching debris left on the bottom electrode after the etching of the conductive layers, and a method for manufacturing the angular velocity sensor. The drive electrode unit, the monitor electrode unit and the sensing electrode unit are each provided with bottom electrode (29) formed on substrate (33) having the shape of a tuning fork, piezoelectric film (30) made of piezoelectric material and formed on bottom electrode (29), and top electrode (31) formed on piezoelectric film (30). Ends (31T) of top electrode (31) are located inside ends (30T) of piezoelectric film (30) so as to expose ends (30T) of piezoelectric film (30) beyond top electrode (31), thereby forming exposed parts (32). When exposed parts (32) have a thickness of "t", piezoelectric film (30) is made to have an exposed width (L) of not less than 0.3 t.

5 Claims, 7 Drawing Sheets

ANGULAR SPEED SENSOR AND METHOD FOR FABRICATING THE SAME

RELATED APPLICATION

This application is the U.S. National Phase under 35 U.S.C. § 371 of International Application No. PCT/JP2005/011517, filed Jun. 23, 2005, which in turn claims the benefit of Japanese Application No. 2004-201513, filed Jul. 8, 2004, the disclosures of which Applications are incorporated by reference herein in their entirety.

TECHNICAL FIELD

The present invention relates to an angular velocity sensor used in various electronic devices, and to a method for manufacturing the angular velocity sensor.

BACKGROUND ART

Figure 8:
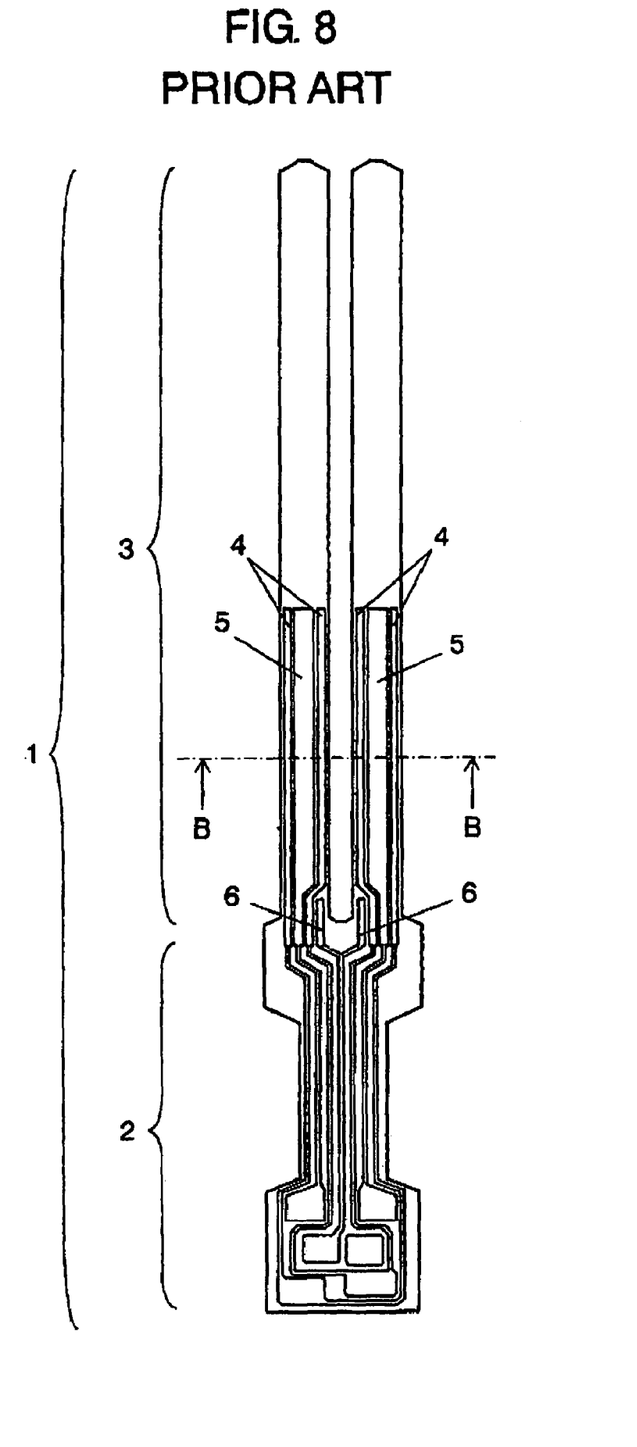
FIG. 8 is a plan view of a vibrator used in the conventional angular velocity sensor.

A conventional angular velocity sensor will be described as follows with reference to drawings. FIG. 8 is a plan view of a vibrator used in the conventional angular velocity sensor, FIG. 9 is a B-B cross sectional view of arms shown in FIG. 8, and FIG. 10 is an enlarged cross sectional view of the inside of circle "Q" shown in FIG. 9.

Figure 9:
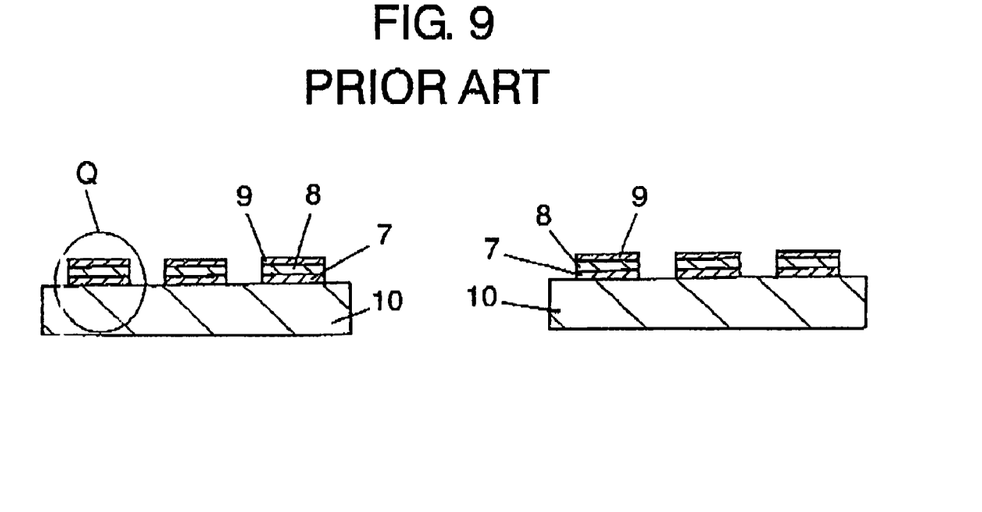
FIG. 9 is a B-B cross sectional view of FIG. 8, showing arms of the vibrator used in the conventional angular velocity sensor.
Figure 10:
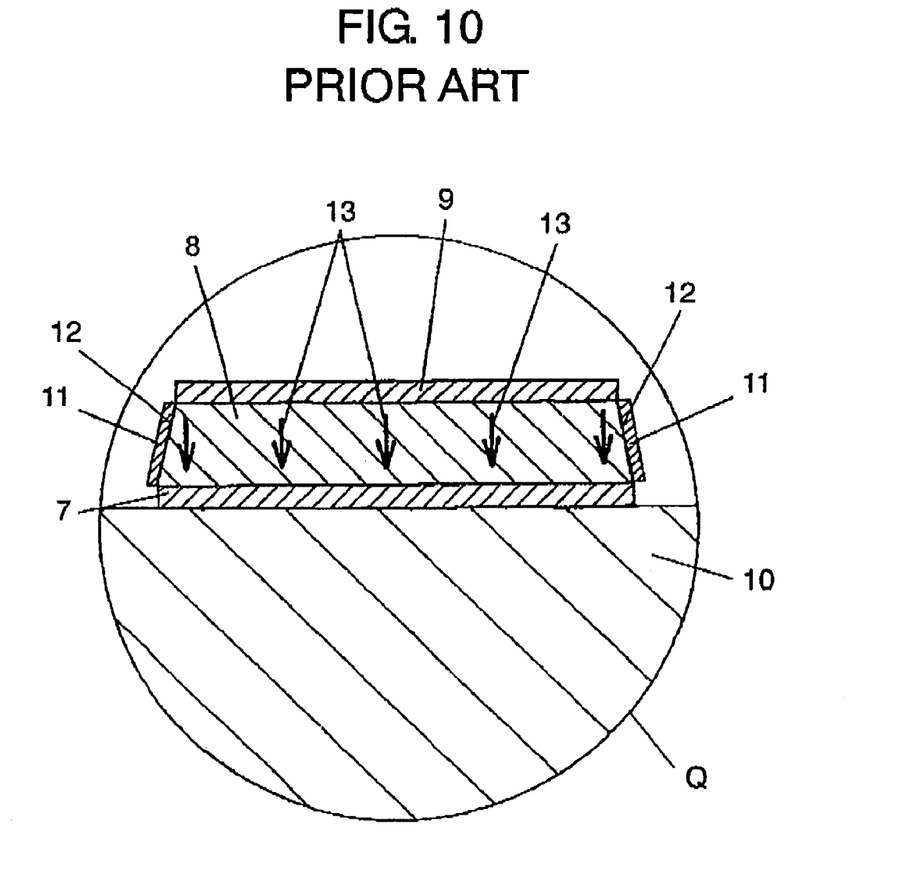
FIG. 10 is an enlarged cross sectional view of the inside of circle "Q" shown in FIG. 9 of the conventional angular velocity sensor.

In FIGS. 8 and 9, the conventional angular velocity sensor is provided with vibrator 1 for detecting angular velocity, and an electronic circuit (unillustrated) connected with vibrator 1. Vibrator 1 and the electronic circuit are accommodated in an unillustrated casing.

In FIG. 8, vibrator 1 includes shaft 2 and a pair of arms 3 so as to take the shape of a tuning fork. Arms 3 are each provided with drive electrode units 4 and sensing electrode unit 5, and further with monitor electrode unit 6 extending from a part of each arm 3 that is adjacent to shaft 2 to shaft 2.

Drive electrode units 4 receive driving signals which drive vibrator 1. Monitor electrode units 6 detect the state of driving vibrator 1, and then output detection signals. Sensing electrode units 5 output angular velocity signals generated based on angular velocity given to vibrator 1.

Each drive electrode unit 4, each monitor electrode unit 6 and each sensing electrode unit 5 shown in FIG. 8 is provided with bottom electrode 7 formed on a tuning-fork-shaped substrate, piezoelectric film 8 made of piezoelectric material and formed on bottom electrode 7, and top electrode 9 formed on piezoelectric film 8 as shown in FIG. 9. More specifically, a conductive layer which is to become bottom electrode 7 is formed on a main surface of silicon substrate 10, and piezoelectric film 8 is formed on the conductive layer. Then, another conductive layer which is to become top electrode 9 is formed on piezoelectric film 8. These are processed into prescribed shapes by using a well-known photolithography method.

In an etching process in the manufacturing method using the photolithography method, the conductive layers are processed into the prescribed shapes. In a case of producing fine vibrator 1, dry etching is adopted because it allows a specific part to be exclusively etched with high precision. The reason for this is that wet etching, for example, would cause the conductive layers which are to become bottom and top electrodes 7, 9 and piezoelectric film 8 to be etched by the etching solution more than necessary so as to make it impossible to obtain a pattern with a prescribed shape, thereby deteriorating the electric properties.

Dry etching is a well-known microfabrication process and is used to manufacture various semiconductor devices. The dry etching is also suitable to manufacture vibrator 1 of an angular velocity sensor of the present invention, and is particularly suitable to etch thin conductive layers with high precision.

One conventional technique related to the invention of this application is shown in Japanese Patent Unexamined Publication No. 2002-257549.

With reference to FIG. 8, vibrator 1 used in the conventional angular velocity sensor is provided with drive electrode units 4, monitor electrode units 6 and sensing electrode units 5. In general, the thickness of etching for the formation of the electrode units of the angular velocity sensor is made thicker than the thickness of etching a semiconductor. This makes it necessary to overcome the inconvenience shown in FIG. 10. That is to say, etching debris 11 is left on each etched surface 12 after the etching of the conductive layer corresponding to, e.g. bottom electrode 7.

In actual use conditions where electric field 13 (shown with the arrows) is applied as in FIG. 10, it is necessary to overcome the inconvenience of etching debris 11 causing an electric short circuit between top electrode 9 and bottom electrode 7.

SUMMARY OF THE INVENTION

The present invention, which overcomes the aforementioned problem, has an object of providing an angular velocity sensor that prevents etching debris of a conductive layer corresponding to, e.g. a bottom electrode from causing an undesired electric short circuit between a top electrode and a bottom electrode in each of drive, monitor and sensing electrode units, thereby having more reliable electric performance and a longer product life, and also of providing a method for manufacturing the angular velocity sensor.

In the angular velocity sensor of the present invention, each drive electrode unit, each monitor electrode unit and each sensing electrode unit is provided with a bottom electrode formed on a substrate, a piezoelectric film made of piezoelectric material and formed on the bottom electrode, and a top electrode formed on the piezoelectric film. The ends of the top electrode are located inside the ends of the piezoelectric film so that the ends of the piezoelectric film can be exposed beyond the ends of the top electrode. In general, the bottom electrode, the piezoelectric film and the top electrode are comparatively long and thin, having longitudinal sides and lateral sides. The longitudinal side corresponds to the length of each of the bottom electrode, the piezoelectric film and the top electrode, and the lateral side corresponds to the width of them. According to the technical idea that the ends of the top electrode are exposed, which is a feature of the present invention, the width of the top electrode is made smaller than that of the piezoelectric film. It also means to provide non-top-electrode-forming portions in the vicinity of the ends of the piezoelectric film.

With the above-mentioned structure, even if etching debris is left on each etched surface after the etching for the formation of the top electrode, the piezoelectric film and the bottom electrode, the piezoelectric film exposed beyond both ends of the top electrode can be prevented from having etching debris thereon. This improvement has been achieved by focusing attention on the fact that the dry etching is performed from the top electrode towards the bottom electrode.

In actual use conditions of the angular velocity sensor of the present invention, it becomes possible to prevent an electric short circuit between the top electrode and the bottom electrode resulting from etching debris, thereby improving the electric performance and reliability in quality of the angular velocity sensor.

REFERENCE MARKS IN THE DRAWINGS 21 vibrator
22 electronic circuit
23 casing
24 shaft
25 arm
26 drive electrode unit
27 sensing electrode unit
28 monitor electrode unit
29 bottom electrode
30 piezoelectric film
30T end of the piezoelectric film
31 top electrode
31T end of the top electrode
32 exposed part (non-top-electrode-forming portion)
33 substrate
35, 35a, 35b resist pattern film
36 etching debris
37 etched surface
38 deteriorated part
39 electric field
40 properties of the present invention
41 properties of the conventional example

DETAILED DESCRIPTION OF PREFERRED EMBODIMENT

An angular velocity sensor of an embodiment of the present invention will be described as follows.

Figure 1:
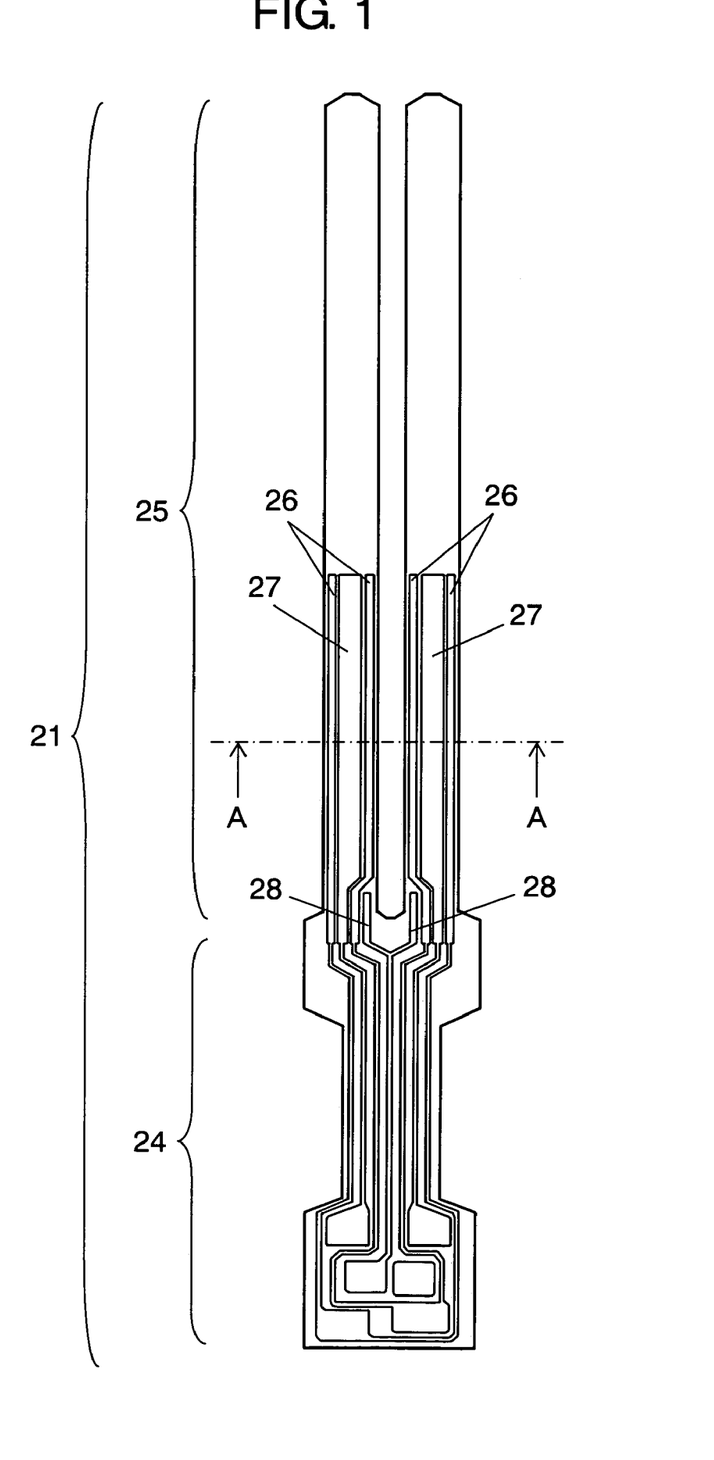
FIG. 1 is a plan view of a vibrator used in an angular velocity sensor of an embodiment of the present invention.
Figure 2:
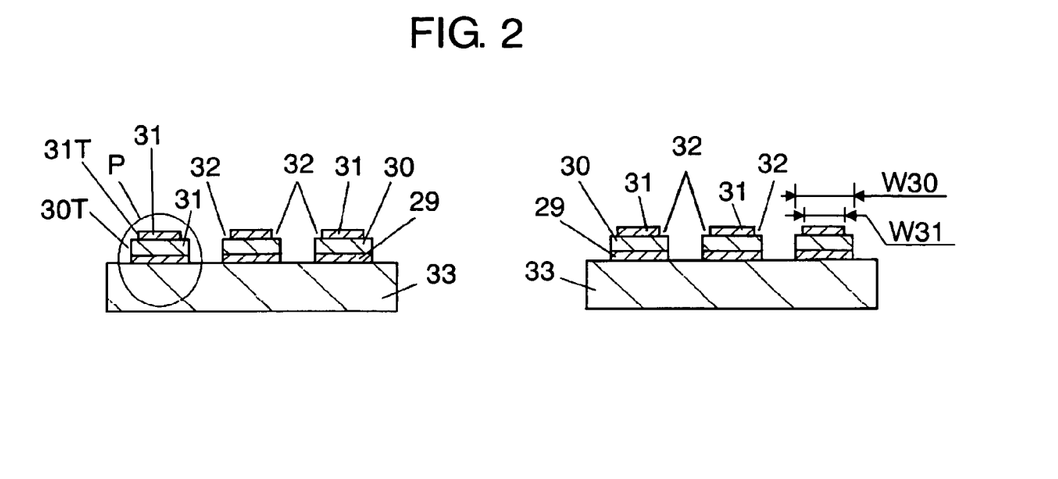
FIG. 2 is an A-A cross sectional view of FIG. 1, showing arms of the vibrator used in the angular velocity sensor.
Figure 3:
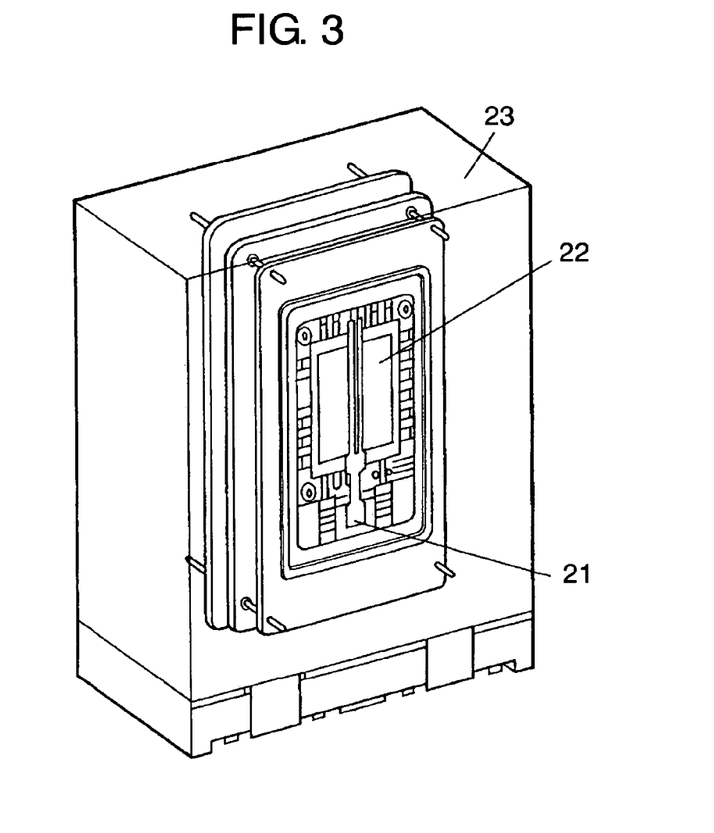
FIG. 3 is a partly transparent perspective view of the angular velocity sensor.
Figure 4A:
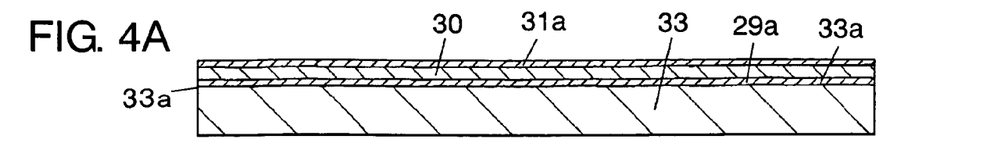
FIG. 4A shows a first manufacturing process of the vibrator used in the angular velocity sensor.
Figure 4B:
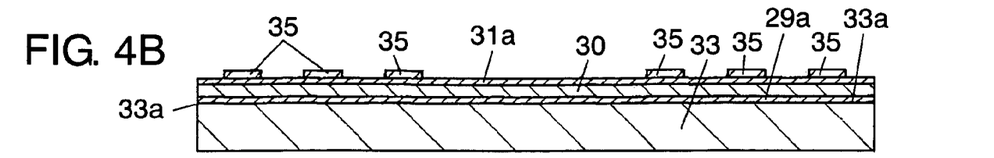
FIG. 4B shows a second manufacturing process of the vibrator used in the angular velocity sensor.
Figure 4C:
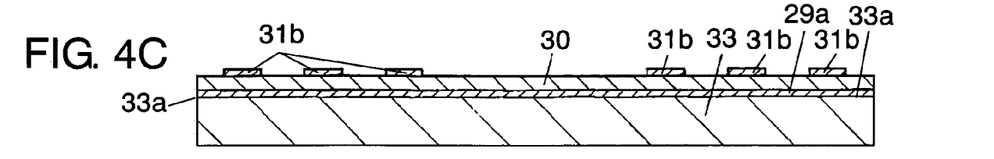
FIG. 4C shows a third manufacturing process of the vibrator used in the angular velocity sensor.
Figure 4D:
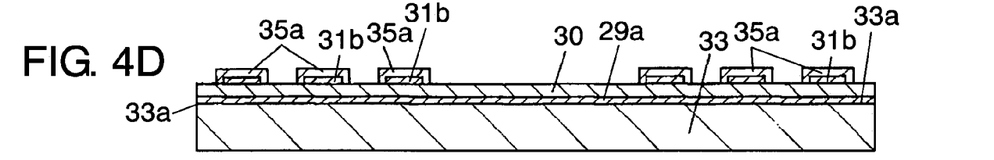
FIG. 4D shows a fourth manufacturing process of the vibrator used in the angular velocity sensor.
Figure 4E:
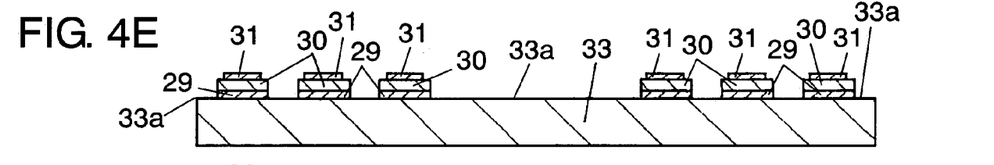
FIG. 4E shows a fifth manufacturing process of the vibrator used in the angular velocity sensor.
Figure 4F:
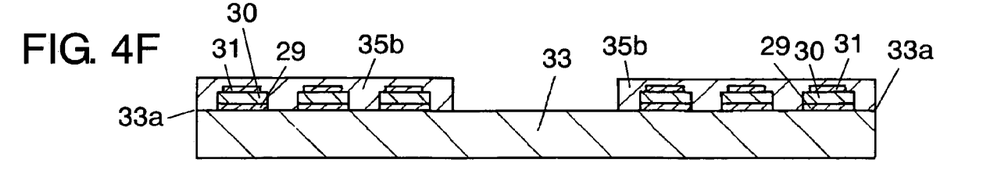
FIG. 4F shows a sixth manufacturing process of the vibrator used in the angular velocity sensor.

FIG. 1 is a plan view of a vibrator used in the angular velocity sensor; FIG. 2 is an A-A cross sectional view of arms; FIG. 3 is a partly transparent perspective view of the angular velocity sensor; FIGS. 4A-4G show manufacturing processes of the vibrator used in the angular velocity sensor; and FIG. 5 is an enlarged cross sectional view of the inside of circle "P" shown in FIG. 4G.

In FIGS. 1 to 3, the angular velocity sensor of the embodiment of the present invention is provided with vibrator 21 for detecting angular velocity, electronic circuit 22 connected with vibrator 21, and casing 23 for accommodating vibrator 21 and electronic circuit 22.

Vibrator 21 includes shaft 24 and a pair of arms 25 so as to take the shape of a tuning fork. Arms 25 are each provided with drive electrode units 26 and sensing electrode unit 27, and further with monitor electrode unit 28 extending from a part of each arm 25 that is adjacent to shaft 24 to shaft 24.

Drive electrode units 26 receive driving signals which drive vibrator 21. Monitor electrode units 28 detect the state of driving vibrator 21, and then output detection signals. Sensing electrode units 27 output angular velocity signals generated based on angular velocity given to vibrator 21.

Each drive electrode unit 26, each sensing electrode unit 27 and each monitor electrode unit 28 is provided with bottom electrode 29 formed on tuning-fork-shaped substrate 33, piezoelectric film 30 made of piezoelectric material and formed on bottom electrode 29, and top electrode 31 formed on piezoelectric film 30. The present invention has a feature in that width W31 of top electrode 31 is made smaller than width W30 of piezoelectric film 30. More specifically, in FIG. 2, ends 31T of top electrode 31 are not nearly collinear with ends 30T of piezoelectric film 30, but are located inside ends 30T of piezoelectric film 30. In other words, top electrode 31 is not extended as far as near ends 30T of piezoelectric film 30 so as to provide so-called exposed parts (non-top-electrode-forming portions) on the piezoelectric film, thereby forming exposed parts 32 where ends 30T of piezoelectric film 30 are exposed beyond ends 31T of top electrode 31 by a prescribed distance (shown with a symbol "L").

Figure 4G:
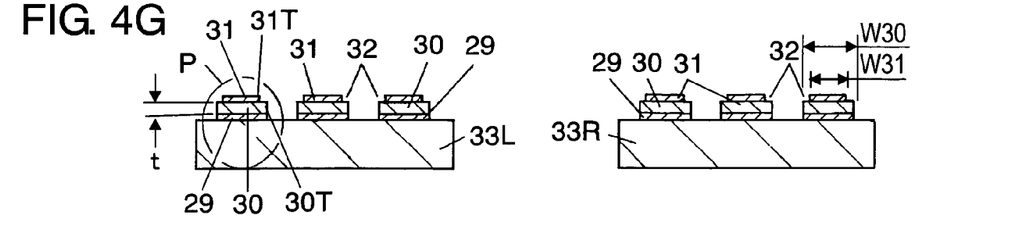
FIG. 4G shows a seventh manufacturing process of the vibrator used in the angular velocity sensor.
Figure 5:
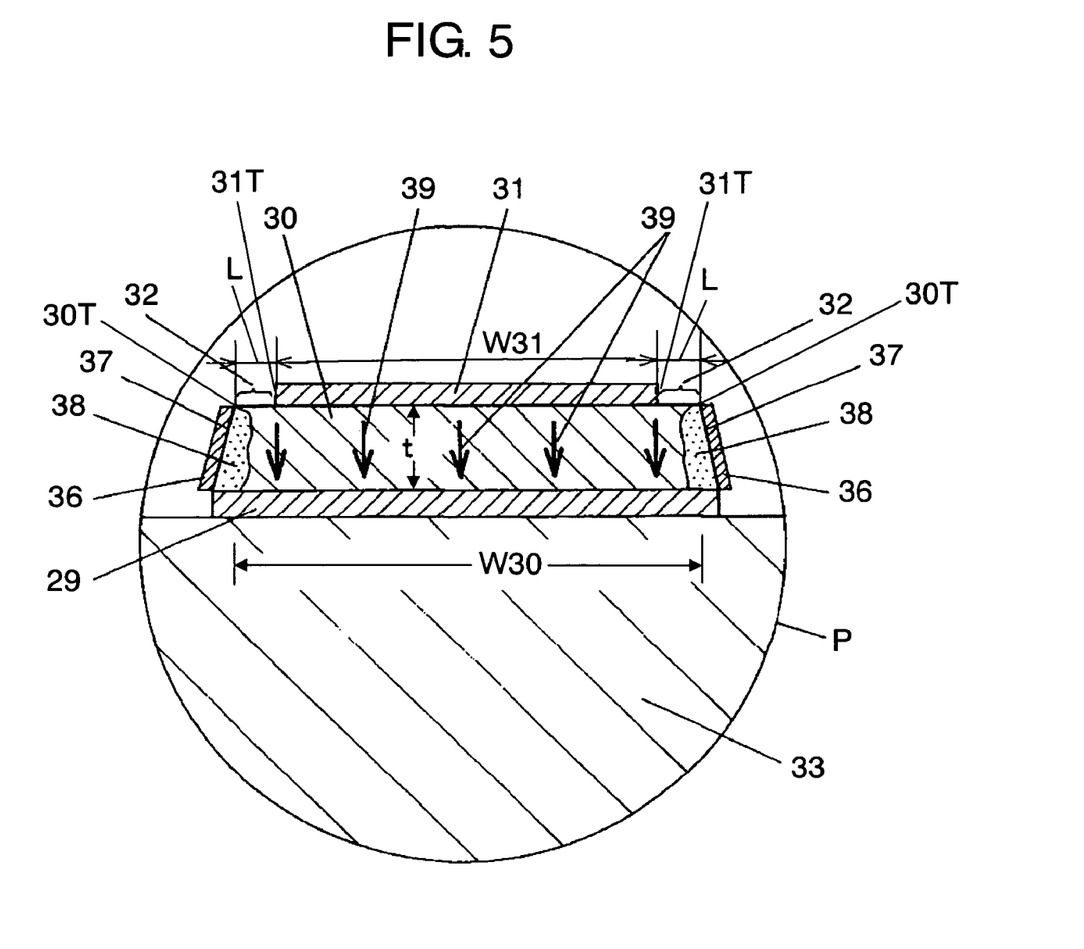
FIG. 5 is an enlarged cross sectional view of the inside of circle "P" shown in FIG. 4G of the present invention.

FIGS. 4A-4G show manufacturing processes of the angular velocity sensor provided with vibrator 21. In manufacturing the angular velocity sensor of the present invention, firstly as in the first manufacturing process shown in FIG. 4A, conductive layer 29a which is to become bottom electrode 29 later shown in FIG. 4G is formed on main surface 33a of silicon substrate 33. Furthermore, piezoelectric film 30 of PZT is formed on conductive layer 29a, and then conductive layer 31a which is to become top electrode 31 is formed on piezoelectric film 30.

As in the second manufacturing process shown in FIG. 4B, resist pattern film 35 with a prescribed shape is formed by the photolithography method on conductive layer 31a which is to become top electrode 31.

As in the third manufacturing process shown in FIG. 4C, dry etching is applied on conductive layer 31a which is to become top electrode 31 except for the portions where resist film 35 is formed, so as to form conductive layer 31b with a prescribed shape.

As in the fourth manufacturing process shown in FIG. 4D, a resist film is coated over conductive layer 31b, which is to become top electrode 31 processed into the prescribed shape, and then the resist film is formed into a prescribed shape as resist pattern film 35a by the photolithography method.

As in the fifth manufacturing process shown in FIG. 4E, piezoelectric film 30, and conductive layer 29a which is to become bottom electrode 29 are processed into the prescribed shapes by dry etching. As a result, the parts of conductive layer 29a and piezoelectric film 30 that are in the center of FIG. 4E are removed by the etching. Thus, main surface 33a is exposed in the center of silicon substrate 33, and is still provided, in the portions other then the center, with bottom electrode 29, piezoelectric film 30 and top electrode 31.

As in the sixth manufacturing process shown in FIG. 4F, a resist film is formed on main surface 33a of silicon substrate 33 by the photolithography method in such a manner as to coat top electrodes 31, piezoelectric films 30, and bottom electrodes 29a processed into the prescribed shape, and then is etched to form resist pattern film 35b with a prescribed shape. This means that resist pattern film 35b is formed on silicon substrate 33 except of the center and its vicinity at which silicon substrate 33 is divided in two in a later etching process.

As in the seventh manufacturing process shown in FIG. 4G, silicon substrate 33 is processed in the shape of a tuning fork by dry etching. Consequently, silicon substrate 33 is divided in two: silicon substrate 33L and silicon substrate 33R. This results in the completion of vibrator 21 (See FIG. 1) having drive electrode units 26 receiving driving signals, sensing electrode units 27 outputting angular velocity signals generated based on the angular velocity given to vibrator 21, and monitor electrode units 28 detecting the state of driving vibrator 21, and then outputting detection signals.

Finally, as shown in FIG. 3, vibrator 21 is connected with electronic circuit 22 and is put in casing 23 so as to complete the angular velocity sensor.

Vibrator 21 (See FIG. 1) thus manufactured has a length of about 3 to 6 mm, a width of about 0.4 to 0.7 mm, and a thickness of about 0.1 to 0.3 mm. Top electrode 31 has a thickness of about 0.1 to 0.4 µm, piezoelectric film 30 has a thickness of about 2 to 4 µm, and bottom electrode 29 has a thickness of about 0.1 to 0.4 µm, thereby achieving miniaturization of vibrator 21.

FIG. 5 is an enlarged cross sectional view of the inside of circle "P" shown in FIG. 4G. As shown in FIG. 5, width W31 of top electrode 31 is made smaller than width W30 of piezoelectric film 30 so that both ends (30T) of piezoelectric film 30 are exposed beyond ends 31T of top electrode 31 in such a manner that exposed parts 32 are formed with the exposed width "L" at both ends of top electrode 31. This means that top electrode 31 is not extended as far as near the ends of piezoelectric film 30, or the so-called non-top-electrode-forming portions are formed at the ends of piezoelectric film 30. With this structure, even if the etching causes each etched surface 37 to have etching debris 36 thereon, etching debris 36 can be prevented from being left on each etched surface 37 because the dry etching is performed from top electrode 31 towards bottom electrode 29. It is preferable that the exposed width "L" of exposed parts 32 of piezoelectric film 30 (corresponding to the width of the so-called non-electrode-forming portions) be set so as not to cause an electric short circuit even if etching debris 36 is left on etched surface 37.

The angular velocity sensor thus manufactured can prevent an electric short circuit between top electrode 31 and bottom electrode 29 resulting from etching debris 36 in the actual use conditions, thereby improving the reliability.

Figure 6:
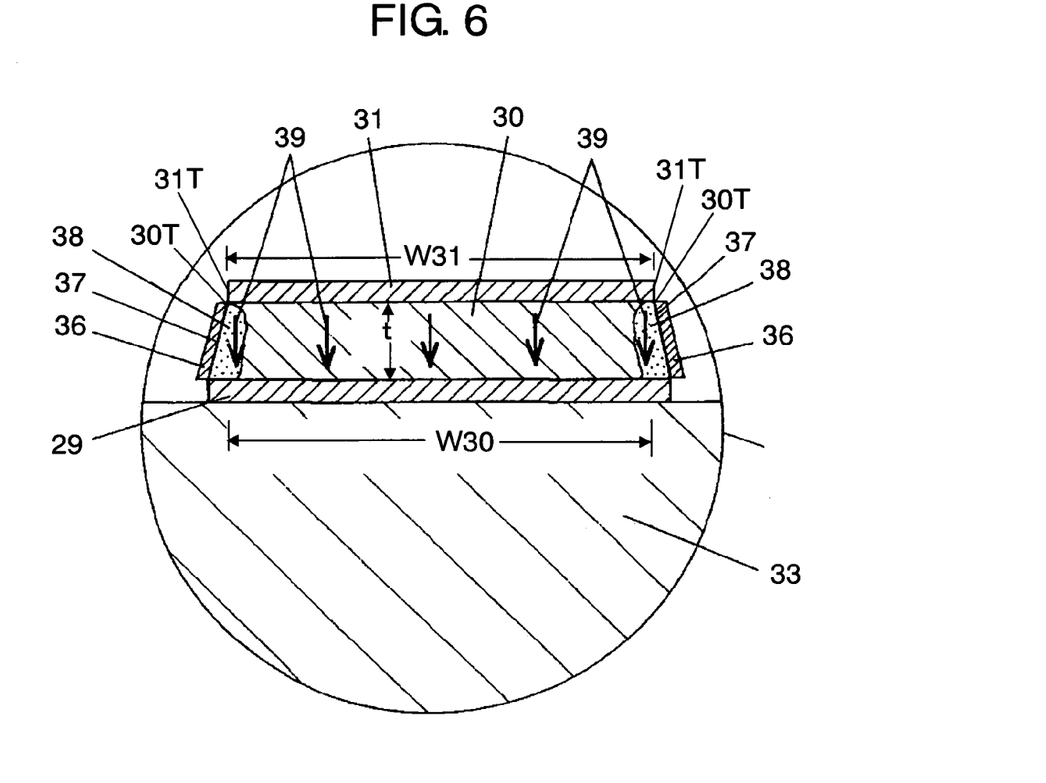
FIG. 6 shows how an electric field is applied when the ends of the piezoelectric film are not exposed beyond the ends of the top electrode, and is an enlarged cross sectional view of the inside of circle "P" shown in FIG. 4G.

FIG. 6 includes a comparative example in which width W31 of top electrode 31 is set nearly equal to width W30 of piezoelectric film 30. In this case, dry etching using plasma would deteriorate the parts of piezoelectric film 30 that are in the vicinity of etched surfaces 37, thereby accelerating the deterioration of deteriorated parts 38 with time. In other words, if piezoelectric film 30 is not exposed by not forming exposed parts 32 at both ends of top electrode 31, without making width W31 of top electrode 31 smaller than width W30 of piezoelectric film 30, it will cause electric field 39 to be applied on deteriorated parts 38 caused in the vicinity of etched surfaces 37 in the direction of the arrows, thereby deteriorating properties of vibrator 21.

In contrast, in the present invention, exposed parts 32 (the so-called non-top-electrode-forming portions) are formed at both ends of top electrode 31 so as to expose ends 30T of piezoelectric film 30 beyond ends 31T of top electrode 31 as shown in FIG. 5. As a result, width W30 of piezoelectric film 30 that substantially functions between top electrode 31 and bottom electrode 29 can be regarded as almost the same as width W31 of top electrode 31. Furthermore, since the parts in the vicinity of etched surfaces 37 are not subjected to electric field 39 applied in the direction of the arrows, piezoelectric film 30 can be prevented from property deterioration resulting from the dry etching.

The exposed width "L" of exposed parts 32 can be determined so as not to be applied so much with electric field 39. Alternatively, a specified exposed width can be determined on the premise that piezoelectric film 30 is previously provided with deteriorated parts 38.

In the angular velocity sensor of the present invention thus manufactured, even if piezoelectric film 30 includes deteriorated parts 38 resulting from dry etching in the vicinity of etched surfaces 37, electric field 39 applied between top electrode 31 and bottom electrode 29 is substantially hardly applied on deteriorated parts 38.

Figure 7:
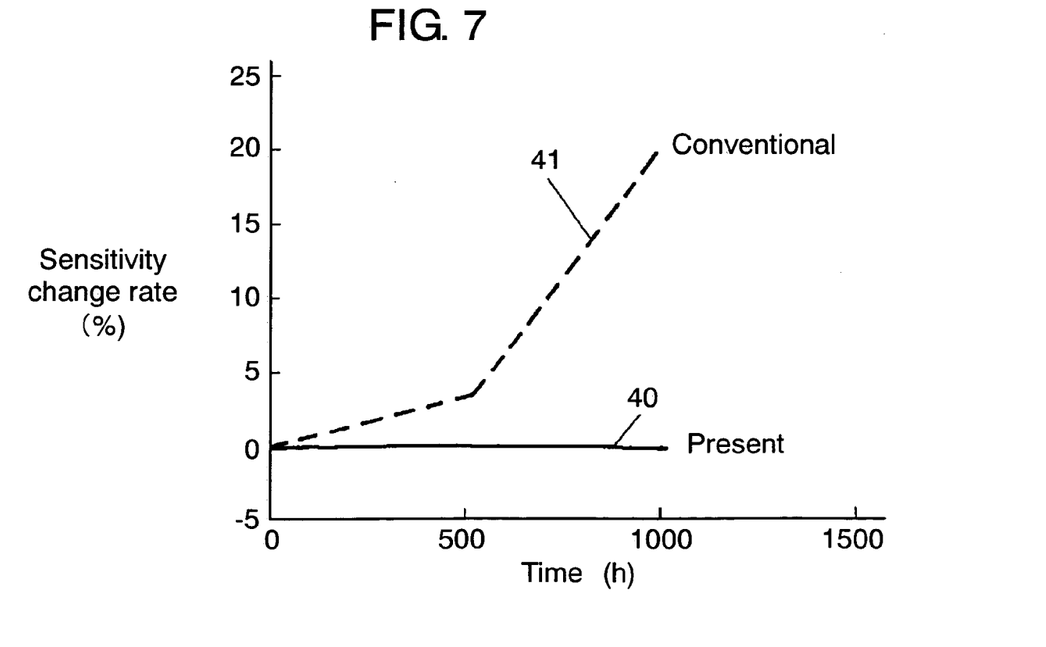
FIG. 7 is a characteristic view showing sensitivity change rate with time of the angular velocity sensor of the present invention and of a conventional angular velocity sensor.

FIG. 7 shows changes in sensitivity change rate over time with respect to the application time of the electric field. It has been found out that in the case of properties 40 of the present invention, the sensitivity change rate never changes with time. It has also been found out that in properties 41 of the conventional example, the sensitivity change rate deteriorates with time in the structure where top electrode 31 does not have exposed parts 32 at both ends thereof, that is, width W31 of top electrode 31 and width W30 of piezoelectric film 30 are made nearly equal to each other, without exposing piezoelectric film 30 beyond ends 31T of top electrode 31.

In the angular velocity sensor thus structured, top electrode 31, piezoelectric film 30 and bottom electrode 29 are formed into the prescribed shapes by dry etching, so that these electrodes and film can be processed with high precision, thereby miniaturizing vibrator 21. Furthermore, the electrode units maintain their reliability so as to extend the product life.

The inventor of the present invention has also found out that in a case where the angular velocity sensor of the present invention is used under high-temperature environment such as in a vehicle, it is preferable that the exposed width "L" of exposed parts 32 satisfy mathematical equation 1 shown below when piezoelectric film 30 has a thickness "t":

$$L \geq 0.3\,t \qquad \text{(mathematical equation 1)}$$

If the thickness "t" of piezoelectric film 30 is, e.g. 3 µm, then the exposed width "L" of piezoelectric film 30 is preferably not less than 0.9 µm.

The effect of the present invention can be exerted even if the exposed width "L" is set outside the range shown in (mathematical equation 1), for example, 0.1 t≦L≦0.2 t. This is because even if etching debris 36 is generated, ends 30T of piezoelectric film 30 and ends 31T of top electrode 31 still have the exposed width "L" of about 0.3 to 0.6 µm therebetween, and the exposed width "L" prevents etching debris 36 from causing an electric short circuit between bottom electrode 29 and top electrode 31. However, if etching debris 36 is generated in the size of, e.g. 0.2 t or over, it is undesirable because this increases the frequency of electric short circuits. In view of this, the exposed width "L" is preferably set to not less than 0.3 t so as to fully exert the effects of the present invention.

As described hereinbefore, in order to prevent an electric short circuit between bottom electrode 29 and top electrode 31, the exposed width "L" of piezoelectric film 30 is desirably not less than 0.3 t. The most desirable situation is that even when the exposed width "L" is increased, width W31 of the top electrode is never decreased. This is because reducing width W31 of top electrode 31 leads to a reduction in drive efficiency and in detection efficiency, that is, a reduction in detection sensitivity. However, in terms of the overall properties of the angular velocity sensor, there are limits to increasing the exposed width "L" only. The reason for this is that achieving the miniaturization and higher sensitivity of the angular velocity sensor does not allow the exposed width "L" to be made so large.

It has been found out through various experiments that the exposed width "L" is preferably set to satisfy (mathematical equation 2) shown below.

$$0.5\ t \leq L \leq 2\ t \quad \text{(mathematical equation 2)}$$

Therefore, if the thickness "t" of piezoelectric film 30 is set to, e.g. 3 µm, the exposed width "L" of exposed parts 32 of piezoelectric film 30 is preferably not less than 1.5 µm nor more than 6 µm.

Substrate 33 is mainly made of silicon, and as the piezoelectric material, PZT is adopted. The use of these materials improves precision in the driving of vibrator 21, the detection of the state of driving vibrator 21, and the output of the angular velocity signals generated resulting from the angular velocity given to vibrator 21 so as to improve properties of vibrator 21.

INDUSTRIAL APPLICABILITY

The angular velocity sensor and method for manufacturing it according to the present invention, which prevents an undesired electric short circuit between the top electrode and the bottom electrode resulting from etching debris, can be used in various electronic devices, thus showing a high industrial value.

The invention claimed is:

1. An angular velocity sensor comprising:
 a vibrator for detecting angular velocity, the vibrator comprising: a drive electrode unit for receiving a driving signal to drive the vibrator;
 a monitor electrode unit for detecting a state of driving the vibrator and outputting a detection signal; and
 a sensing electrode unit for outputting an angular velocity signal generated based on an angular velocity given to the vibrator, wherein
 the drive electrode unit, the monitor electrode unit and the sensing electrode unit are each made up of a bottom electrode formed on a substrate, a piezoelectric film made of piezoelectric material and formed on the bottom electrode, and a top electrode formed on the piezoelectric film, wherein
 when the piezoelectric film has a thickness of "t", the piezoelectric film is made to have an exposed width "L" of not less than 0.3 t. the exposed width "L" extending from the end of the piezoelectric film to the end of the top electrode, and
 an end of the top electrode is located inside an end of the piezoelectric film so as to expose the end of the piezoelectric film beyond the end of the top electrode.

2. The angular velocity sensor of claim 1, wherein
 the vibrator has a shaft and a pair of arms so as to take a shape of a tuning fork, and
 each of the pair of arms is provided with the drive electrode unit and the sensing electrode unit, and is further provided with the monitor electrode unit on a part thereof that is adjacent to the shaft.

3. The angular velocity sensor of claim 1, wherein
 the top electrode, the piezoelectric film and the bottom electrode are formed into prescribed shapes by dry etching.

4. The angular velocity sensor of claim 1, wherein
 the substrate is mainly made of silicon, and the piezoelectric material is PZT.

5. A method for manufacturing an angular velocity sensor comprising a vibrator for detecting angular velocity, the vibrator comprising a drive electrode unit for receiving a driving signal to drive the vibrator; a monitor electrode unit for detecting a state of driving the vibrator and outputting a detection signal; and a sensing electrode unit for outputting an angular velocity signal generated based on an angular velocity given to the vibrator, the method comprising a process of forming the drive electrode unit, the monitor electrode unit and the sensing electrode unit, the process comprising:
 forming a bottom electrode on a substrate;
 forming a piezoelectric film made of piezoelectric material on the bottom electrode; and
 forming a top electrode on the piezoelectric film, wherein
 when the piezoelectric film has a thickness of "t", the piezoelectric film is made to have an exposed width "L" of not less than 0.3 t, the exposed width "L" extending from the end of the piezoelectric film to the end of the top electrode, wherein
 the top electrode, the piezoelectric film and the bottom electrode are formed into prescribed shapes by dry etching in such a manner that an end of the top electrode is located inside an end of the piezoelectric film so as to expose the end of the piezoelectric film beyond the end of the top electrode.

* * * * *